(12) United States Patent
Omori (10) Patent No.: US 7,393,058 B2
(45) Date of Patent: Jul. 1, 2008

(54) ARMREST HEIGHT-ADJUSTING DEVICE

(75) Inventor: Misao Omori, Tochigi-ken (JP)

(73) Assignee: TS Tech Co., Ltd., Asaka-shi (JP)

( * ) Notice: Subject to any disclaimer, the term of this patent is extended or adjusted under 35 U.S.C. 154(b) by 0 days.

(21) Appl. No.: 10/540,853

(22) PCT Filed: Dec. 24, 2003

(86) PCT No.: PCT/JP03/16594

§ 371 (c)(1),
(2), (4) Date: Dec. 15, 2005

(87) PCT Pub. No.: WO2004/058008

PCT Pub. Date: Jul. 15, 2004

(65) Prior Publication Data

US 2006/0138845 A1   Jun. 29, 2006

(30) Foreign Application Priority Data

Dec. 26, 2002   (JP) .............................. 2002-378522

(51) Int. Cl.
*A47C 7/54* (2006.01)
(52) U.S. Cl. ............................ 297/411.32; 297/411.35; 297/115; 297/411.38
(58) Field of Classification Search ................ 297/115, 297/411.32, 411.35, 411.38
See application file for complete search history.

(56) References Cited

U.S. PATENT DOCUMENTS

| 5,076,645 A | * | 12/1991 | Yokota | ................... | 297/411.32 |
| 6,047,444 A | * | 4/2000 | Braun | .......................... | 16/324 |
| 6,050,645 A | * | 4/2000 | Bradbury | ............... | 297/411.38 |
| 6,209,960 B1 | * | 4/2001 | Bradbury | ............... | 297/411.35 |
| 6,650,232 B1 | * | 11/2003 | Strohbeck et al. | ......... | 340/384.7 |
| 6,652,032 B2 | * | 11/2003 | Laval | ..................... | 297/411.32 |
| 6,755,474 B2 | * | 6/2004 | Magnuson | ............. | 297/411.38 |
| 6,916,068 B2 | * | 7/2005 | Kitamura et al. | ......... | 297/411.3 |
| 7,140,688 B2 | * | 11/2006 | Hann | ..................... | 297/411.32 |
| 2002/0096928 A1 | * | 7/2002 | Bidare | .................... | 297/411.32 |
| 2005/0242649 A1 | * | 11/2005 | Himmelhuber et al. | | 297/411.38 |

FOREIGN PATENT DOCUMENTS

| JP | 13253/1993 | 2/1993 |
| JP | 2003-33252 A | 2/2003 |

* cited by examiner

*Primary Examiner*—Laurie K. Cranmer
(74) *Attorney, Agent, or Firm*—Browdy and Neimark (57) ABSTRACT

An armrest height-adjusting device has a collar (10) fixed to an arm frame (8) and a spring (11). The spring (11) includes a coil portion (11A), provided around the collar (10), a first leg portion (11B) engaging with the seat back frame (5), and a second leg portion (11C) received in a window portion (41) of the arm frame (8). A diameter of the coil portion (11A) becomes short by the downward rotation of the arm frame (8) and becomes large by the upward rotation of the arm frame (8). The second leg portion (11C) is guided into the hook (24) by abutting against the window portion (41) when the arm frame (10) is rotated upward beyond a predetermined position. When the second leg portion (11C) is engaged with the hook (24), the diameter of the coil portion (11A) is kept in a state of becoming large.

4 Claims, 7 Drawing Sheets

ARMREST HEIGHT-ADJUSTING DEVICE

TECHNICAL FIELD

The present invention relates to an armrest height-adjusting device of a vehicle seat.

BACKGROUND ART

Heretofore, in general, a height-adjusting device having a lock spring and a shaft disposed within a coil portion of the lock spring and holding an armrest at an arbitrary position by frictional resistance generated between the coil portion and the shaft has been publicly known (for example, Japanese Utility Model Application Laid-Open No. 5-53547).

The prior art device has been carrying a problem of requiring an operating lever to increase and decrease the frictional resistance between the coil portion and the shaft.

Further, the prior art device has caused trouble in the position adjustment method of the armrest.

DISCLOSURE OF THE INVENTION

An object of the present invention is to provide an armrest height-adjusting device, which does not require an operating lever.

Further, another object of the present invention is to provide an armrest height-adjusting device, which is simple in an operation method.

Further, another object of the present invention is to provide an armrest height-adjusting device, which can simply change a working range of the armrest.

BEST MODE FOR CARRYING OUT THE INVENTION

An embodiment of the present invention will be described with reference to the drawings. A vehicle seat 1 according to the present invention has a seat bottom 2 slidably attached to a vehicle body (not shown), a reclining seat back 3 rotatably supported by the seat bottom 2, and an armrest 4 provided at the side portion of the seat back 3.

A seat back frame 5 of the seat back 3 is fixed with a bracket 6. An arm frame 8 of the armrest 4 is rotatably attached to the bracket 6 (frame 8) by a shaft 7 extending in a left-and-right direction of the vehicle seat. Between a base of the arm frame 8 and the seat back frame 5, a lock device 40 is provided.

Figure 1:
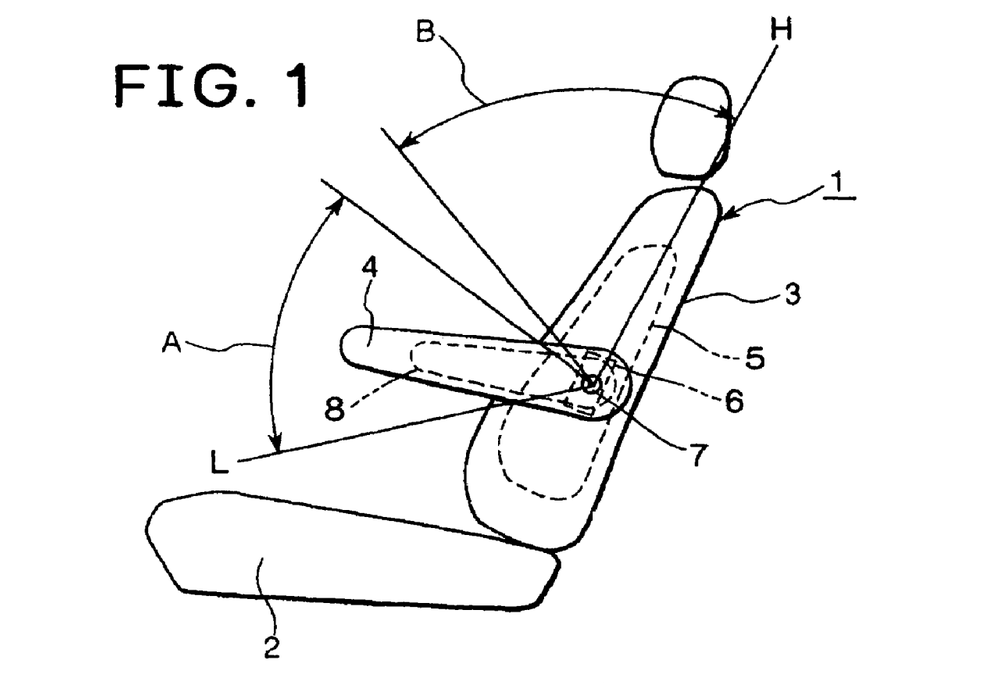
FIG. 1 is a side view of a vehicle seat comprising an armrest height-adjusting device according to the present invention.

The armrest 4, as shown in FIG. 1, is displaceable between a lower limit position L and an upper limit position H. The armrest 4 is usually used within a working range A. In the working range A, the armrest 4 is held at an arbitrary position by the lock device 40. That is, the displacement of the armrest 4 toward the lower limit position L is restricted by the lock device 40. However, the lock device 40 does not restrict the displacement of the armrest 4 toward the upper limit position H. Further, the lock device 40 does not restrict the rotation of the armrest 4 in a storing range B set upward than the working range A. That is, the armrest 4 freely rotates in the storing range B. Further, the lock device 40 does not restrict the rotation of the armrest 4 in the working range A when the armrest 4 is displaced from the storing range B into the working range A. A locking function of the lock device 40 in the working area A is restored when the armrest 4 is substantially displaced till the lower limit position L.

Figure 2:
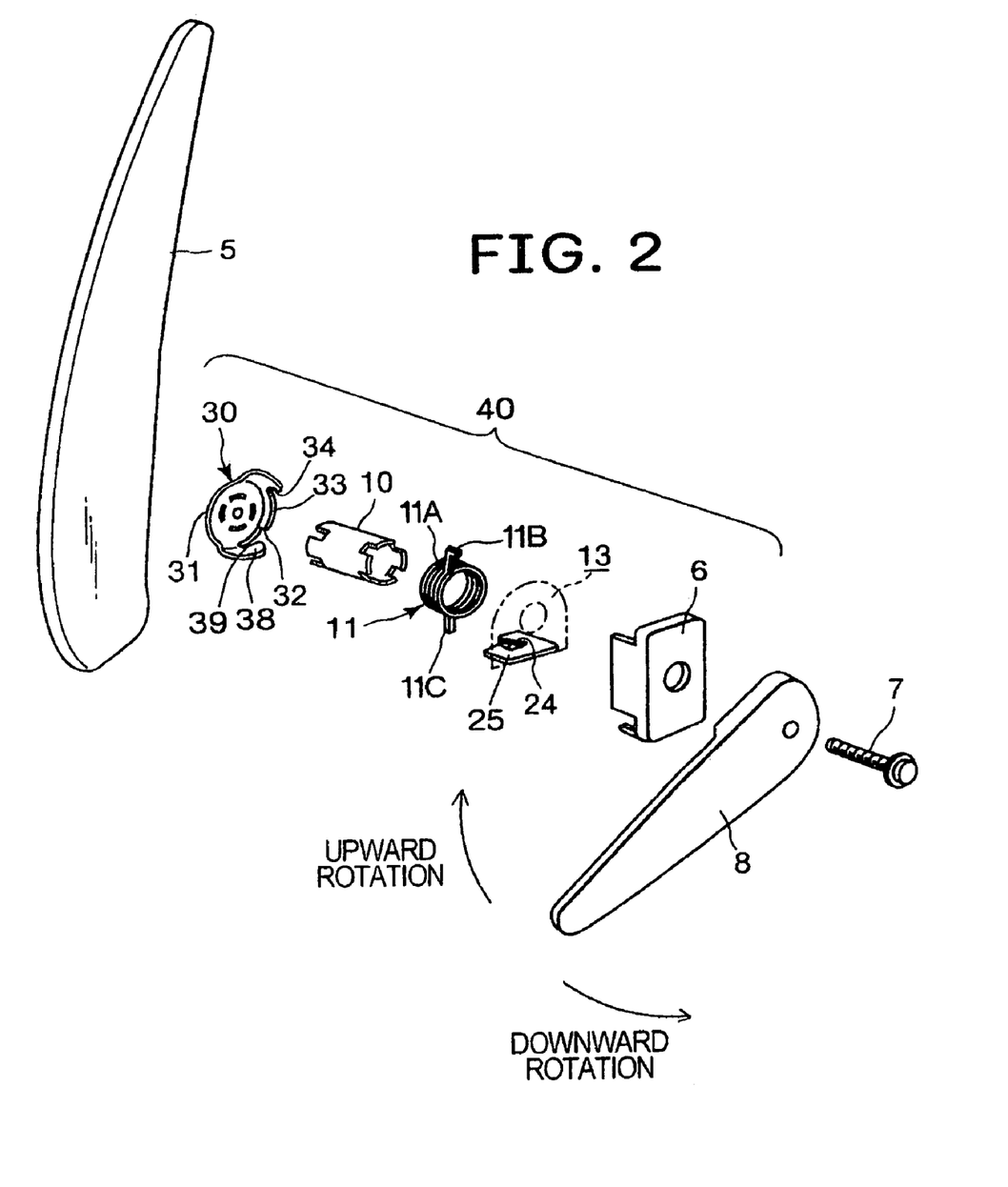
FIG. 2 is an exploded oblique view of a lock device of the height-adjusting device.

The lock device 40 has a lock spring 11. A coil portion 11A of a spring 11 is disposed on the outer periphery of a collar 10, and the shaft 7 is inserted into the collar 10. One end of the collar 10 penetrates through the bracket 6 so as to be fixed to the arm frame 8. Consequently, the collar 10 rotates integrally with the armrest 4. A first bent leg portion 11B of the lock spring 11 is engaged with an engaging hole 14 of a secondary bracket 13 which is fixed to the bracket 6. A second straight leg portion 11C is allowed to protrude long in the radial direction of the coil portion 11A. The coil portion 11A closely contacts the collar 10 with adequate strength.

The other end of the collar 10 is fixed with a spring cover 30. The spring cover 30 comprises a disk plate 31 and a bent flange 38 extending from the outer peripheral edge of the plate 31 toward the arm frame 8. The bent flange 38 has a window portion 41 in which the second straight leg portion 11C is stored. One side surface of the window portion 41 is formed with an unlock abutting wall 32 approximately in parallel with the axial direction of the shaft 7, and the other side surface is formed with a return inclined wall 39.

Figure 4:
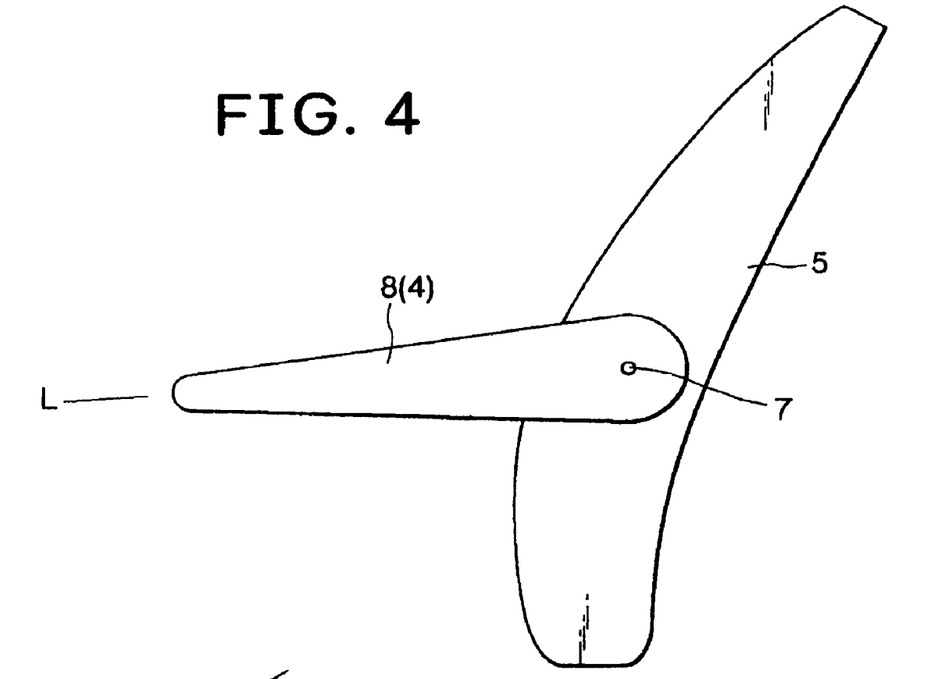
FIG. 4 is a side view showing a seat back frame and the armrest frame at a lower limit position.
Figure 5:
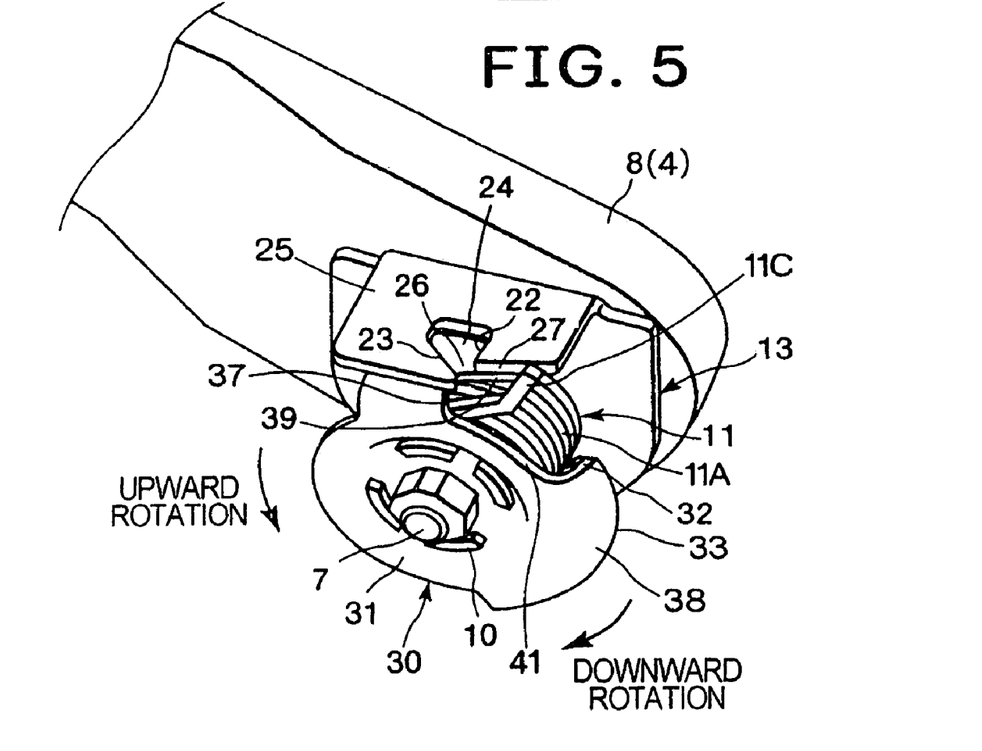
FIG. 5 is an oblique view of the lock device when the armrest is at the lower limit position.
Figure 6:
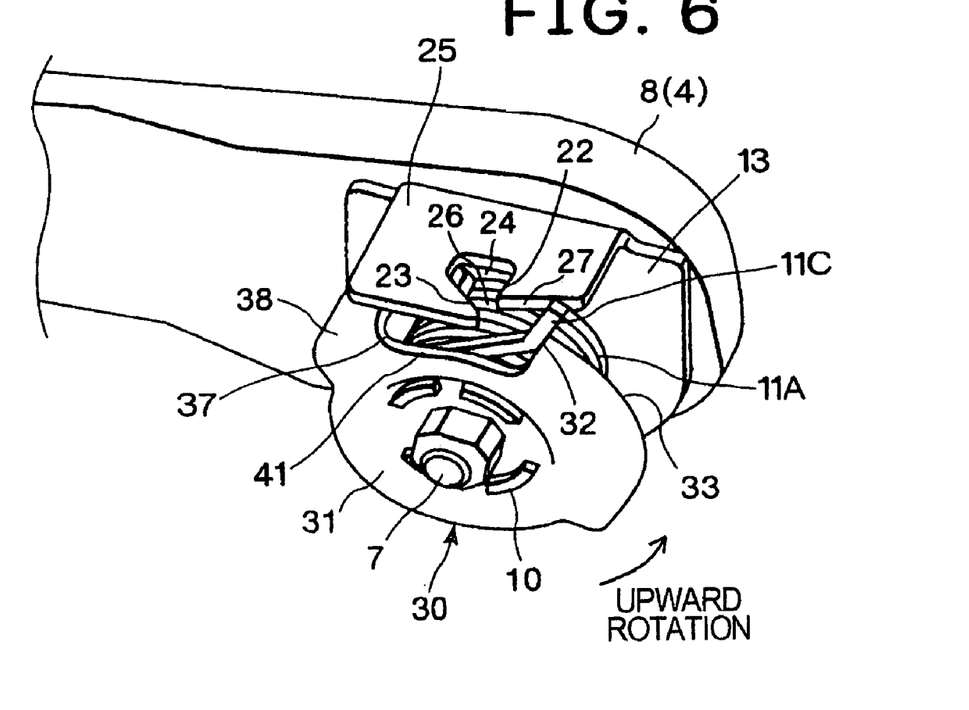
FIG. 6 is an oblique view of the lock device when the armrest is at the top position in a working range.

As shown in FIG. 4, when the arm frame 8 is at the lower limit position L, as shown in FIG. 5, the straight leg portion 11C is positioned at a terminal portion 37 of the inclined wall 39, and when the arm frame 8 moves to the top position in the working range A, as shown in FIG. 6, the unlock abutting wall 32 just abuts against the straight leg portion 11C. Consequently, when the arm frame 8 is positioned in the working range A, the spring cover 30 does not substantially abut against the straight leg portion 11C, and the straight leg portion 11C is kept in a state in which whatever external force is not received.

When the straight leg portion 11C is in a state in which whatever external force is not received, the coil portion 11A closely contacts the collar 10 with adequate strength. By the frictional resistance due to this contact, the armrest 4 is kept at an arbitrary position in the working range A. When the elbow of a driver and the like is mounted on the armrest 4 and the armrest 4 (collar 10) is intended to rotate downward, the coil portion 11A becomes short in diameter and strongly wounds around the collar 10, so that the frictional resistance between the coil portion 11A and the collar 10 is instantaneously increased. This increased frictional resistance prevents the downward rotation of the armrest 4. When the armrest 4 is rotated upward, the diameter of the coil 11A instantaneously becomes large, and the frictional resistance between the coil portion 11A and the collar 10 is reduced, so that the armrest 4 can be smoothly rotated upward, and when rotation of the armrest 4 is stopped, the coil portion 11A closely contacts the collar 10 again with adequate strength.

The secondary bracket 13 has a bent plate 25 which is in parallel with the shaft center of the shaft 7 and extends toward the seat back frame 5, and the bent plate 25 is formed with a hook 24 capable of engaging with the straight leg portion 11C. The hook 24 has an inclined guide cam surface 23 which guides the straight leg portion 11C into the hook 24 and an unlock holding surface 22 for holding the straight leg portion 11C at an unlock position. The unlock holding surface 22 is either formed in parallel with the shaft center of the shaft 7 or formed in a gentle inclined surface as shown in FIG. 12.

Between the guide cam surface 23 and the unlock holding surface 22, there is formed a passage 26. The bent plate 25 comprises an inclined surface 27 communicating with the passage 26.

Figure 7:
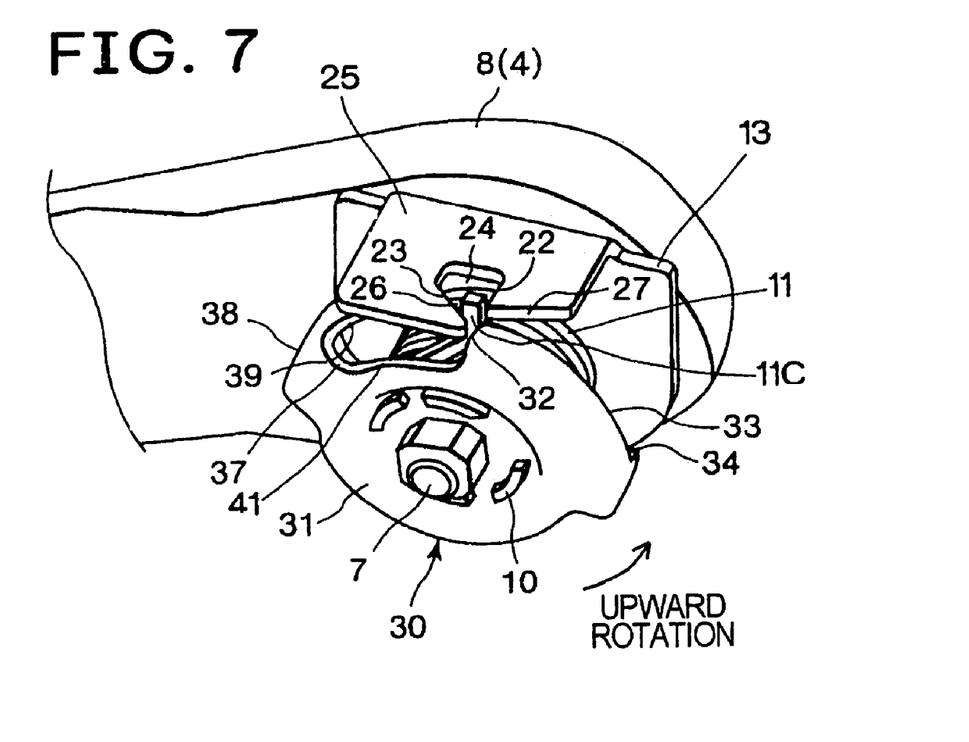
FIGS. 7 and 8 are oblique views of the lock device when the armrest moves from the working range to a storing range.
Figure 8:
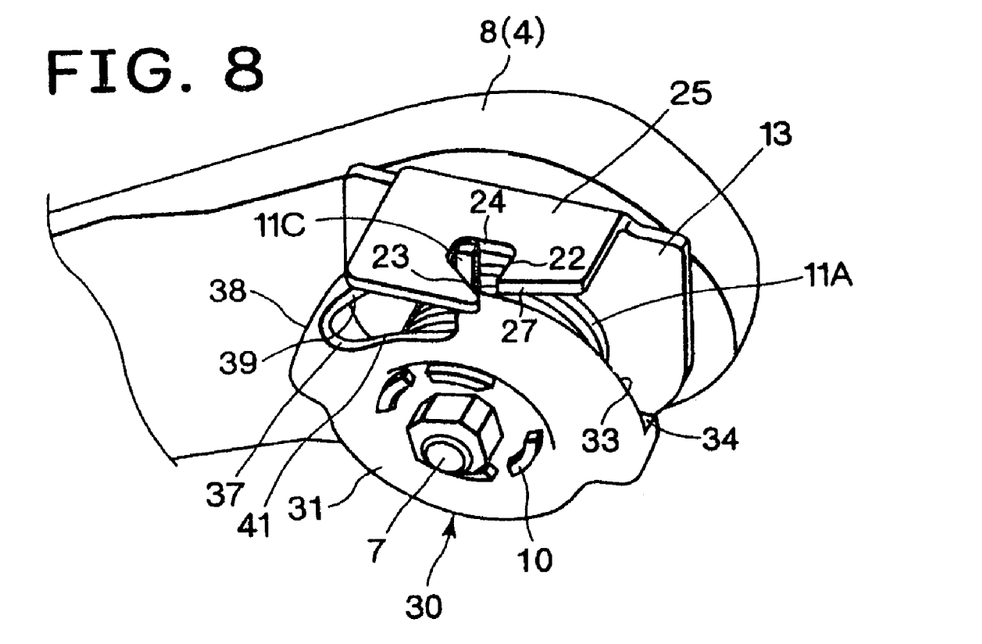
Figure 12:
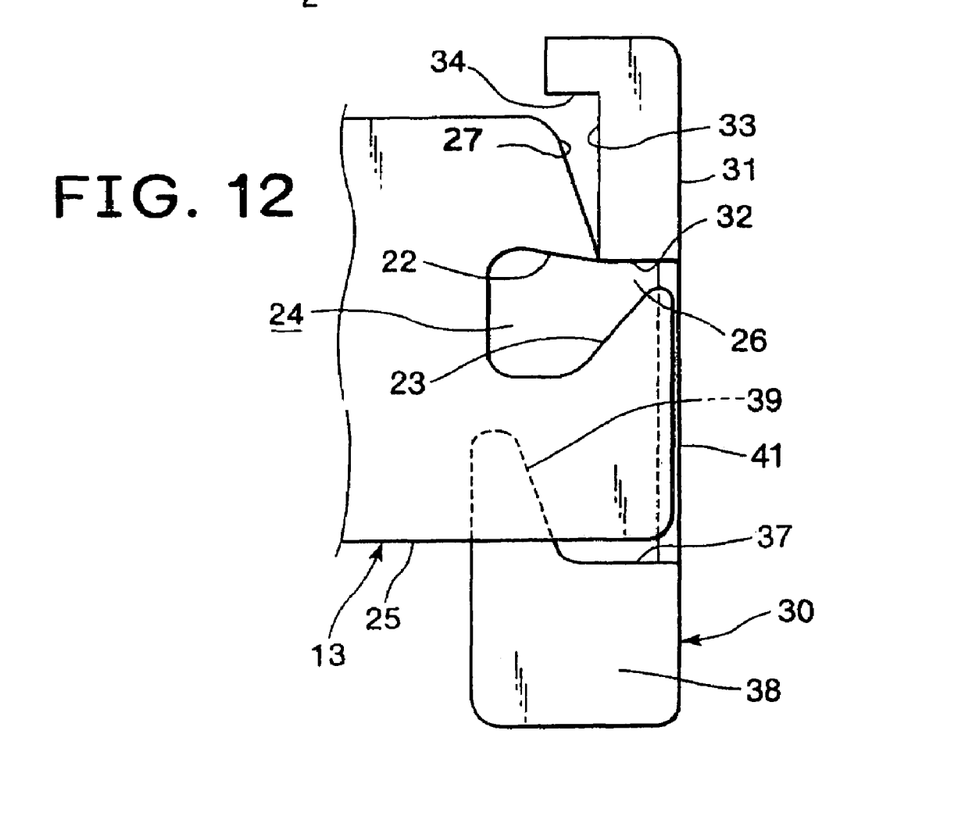
FIG. 12 is a view showing a relation between a window portion of a spring cover and a hook of a bent plate.

The end edge of the unlock abutting wall 32 of the spring cover 30, as shown in FIG. 12, is either brought into line with the end edge of the unlock holding surface 22 or these end edges are overlapped with each other. When the armrest 4 further rotates upward from the state of FIG. 6 in which the arm frame 8 is at the top position in the working range A, as shown in FIG. 7, the straight leg portion 11C pushed by the unlock abutting wall 32 abuts against the guide cam surface 23, and is guided into the hook 24. As shown in FIG. 8, when the straight leg portion 11C moves into the, hook 24, it falls off from the unlock abutting wall 32, and after that, the straight leg portion 11C, as shown in FIG. 9, abuts against the unlock holding surface 22 by the elastic force of the coil portion 11A.

Figure 9:
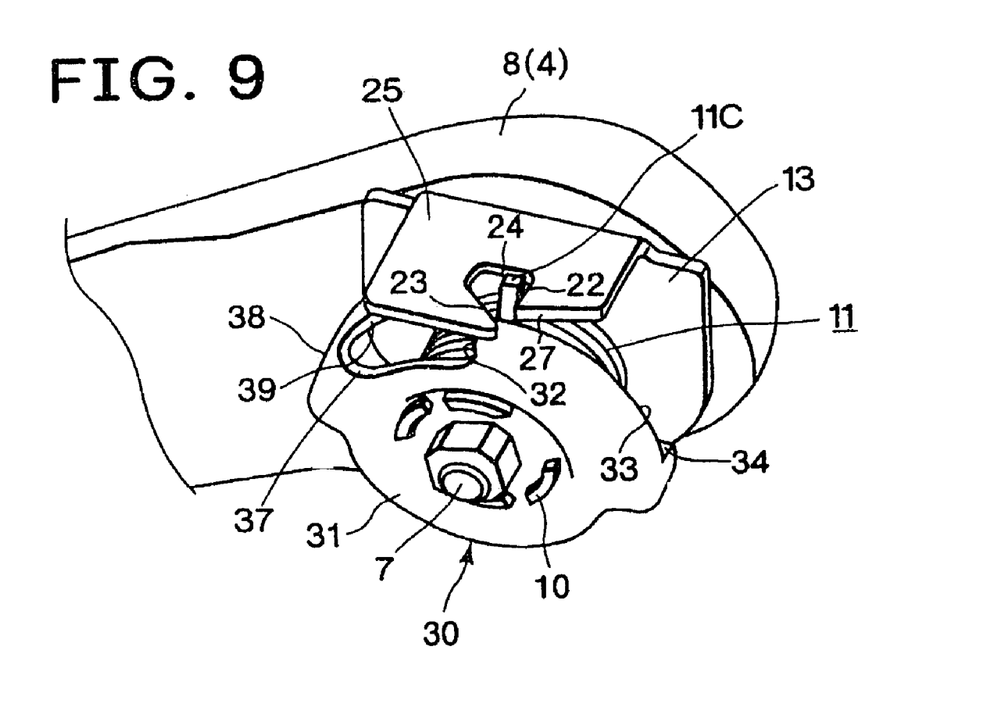
FIG. 9 is an oblique view of the lock device when the movement to the storing range of the armrest is completed.

As shown in FIG. 9, the position in which the straight leg portion 11C abuts against the unlock holding surface 22 of the secondary bracket 13 becomes the lower position of the storing range B of the armrest 4.

Figure 3:
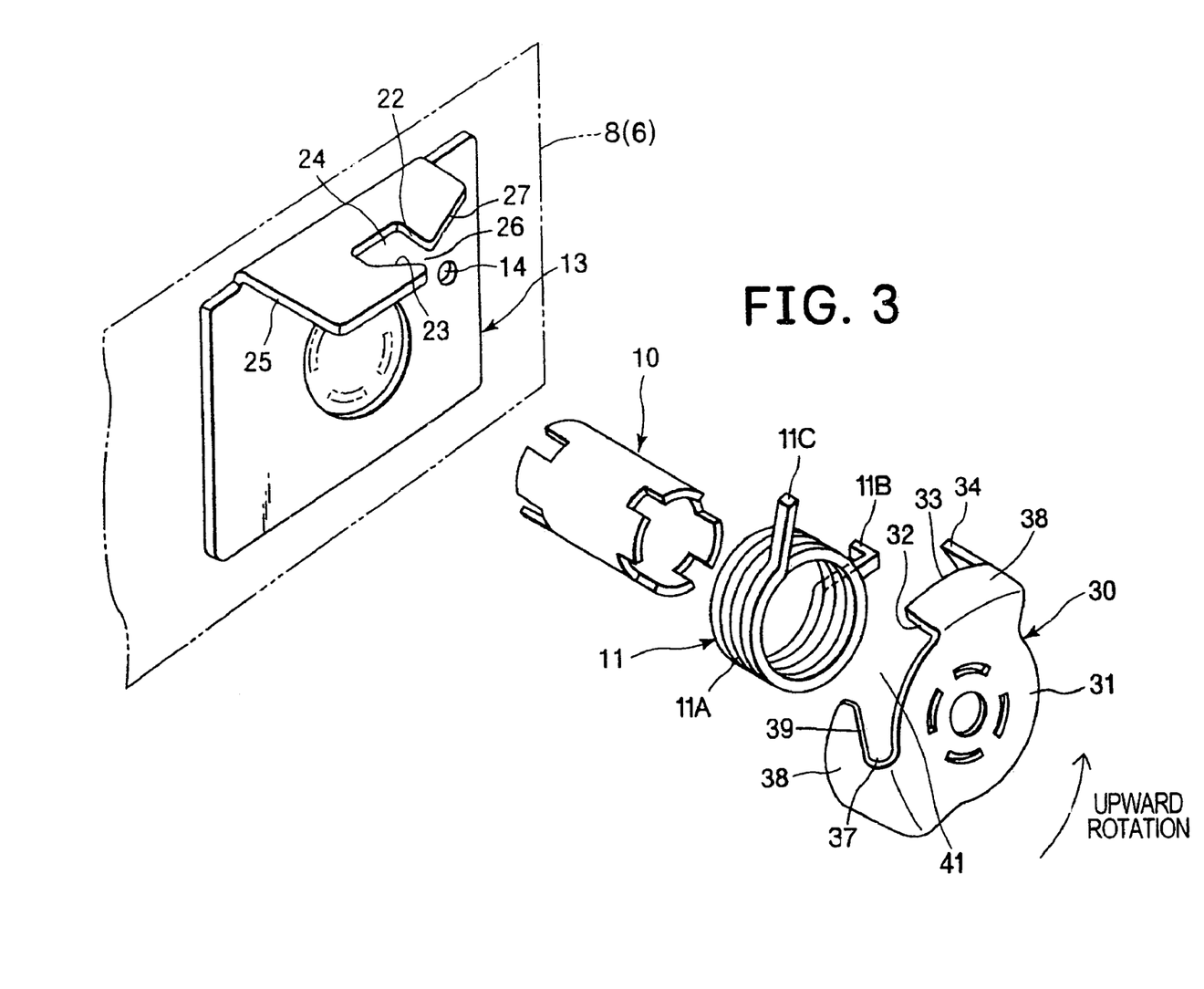
FIG. 3 is an oblique view of the lock device.

As shown in FIG. 3, the bent flange 38 is formed with a closed wall 33 orthogonal to the axial direction of the shaft 7. The closed wall 33 communicates with the end edge of the unlock abutting wall 32. As shown in FIG. 9, in a state in which the straight leg portion 11C abuts against the unlock holding surface 22, the closed wall 33 substantially closes the passage 26 of the hook 24, and prevents the straight leg portion 11C from falling off from the unlock holding surface 22.

Figure 10:
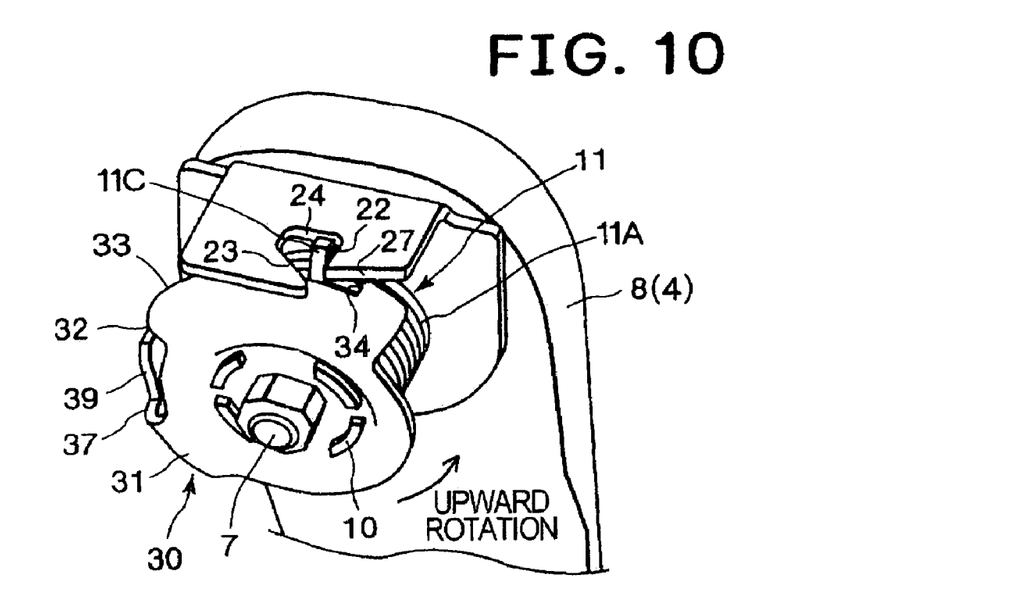
FIG. 10 is an oblique view of the lock device when the armrest is at an upper limit position.

In a state in which the straight leg portion 11C is engaged with the unlock holding surface 22, the diameter of the coil portion 11A is kept in a state of becoming large. The frictional resistance at this time between the coil portion 11A and the collar 10 becomes considerably small, and the armrest 4 can be rotated by a slight operational force. FIG. 10 shows a state when the armrest 4 is moved till the upper limit position H.

The end portion of the closed wall 33 is provided with a stopper 34 in parallel with the axial center of the shaft 7. The stopper 34 prevents an excessive rotation of the armrest 4.

Figure 11:
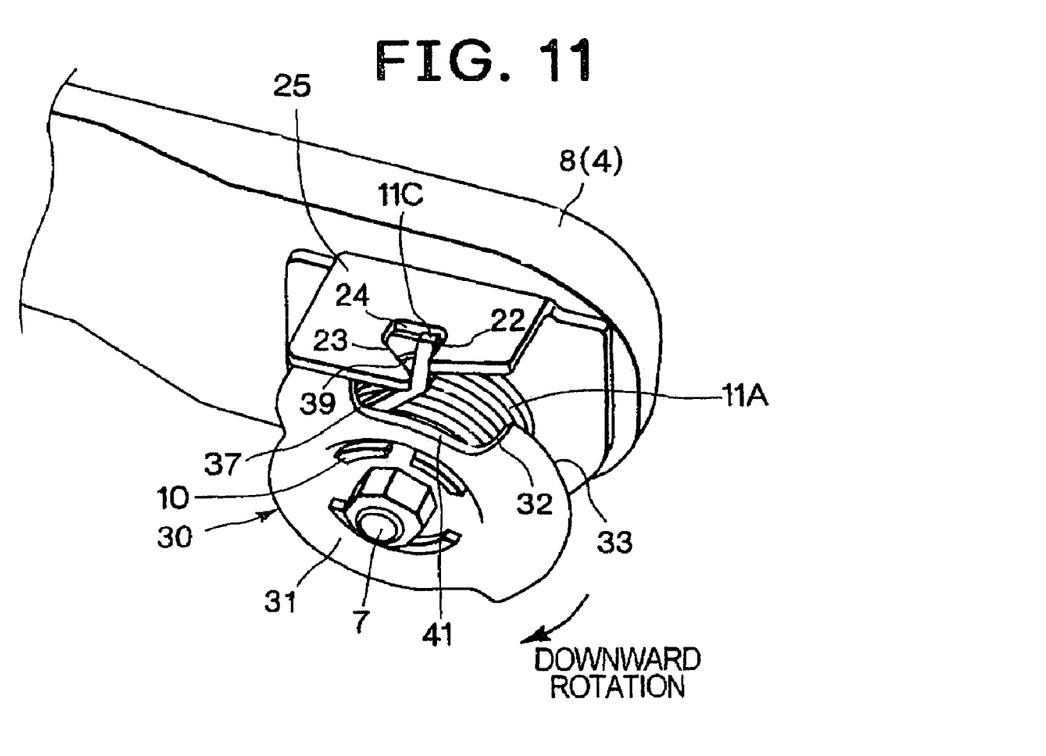
FIG. 11 is an oblique view of the lock device when the armrest moves to the vicinity of the lower limit position from the storage position.

When the armrest 4 in the storing range B is rotated downward, first, the closed wall 33 is separated from the passage 26 of the hook 24. However, usually, even if the closed wall 33 is separated from the passage 26, the straight leg portion 11C is kept in a state engaged with the unlock holding surface 22. The inclined unlock holding surface 22 more effectively prevents the falling off of the straight leg portion 11C from the unlock holding surface 22. Hence, even after the armrest 4 enters the working range A, it can further move downward by a slight operational force. When the armrest 4 comes near to the lower limit position L, as shown in FIG. 11, the return inclined wall 39 of the spring cover 30 abuts against the straight leg portion 11C, and this allows the straight leg portion 11C to be pushed toward the passage 26 and separated from the unlock holding surface 22. Then, the straight leg portion 11C is restored to the initial position by the elastic force of the coil portion 11A, and the frictional resistance between the coil portion 11A and the collar 10 is also restored to the adequate strength, and this allows the locking function in the working range A of the lock device 40 to be recovered.

EFFECT OF THE INVENTION

In the present invention, the structure is simple since the armrest 4 functions as an operating lever.

In the present invention, the width of the working range A of the armrest 4 can be simply changed through the change of the distance between the unlock abutting wall 32 of the spring cover 30 and the inclined wall 39 (terminal portion 37).

In the present invention, when the armrest 4 is displaced from the storing range B toward the working range A, the closed wall 33 of the window portion 41 closes the passage 26 of the hook 24 so as to prevent the straight leg portion 11C from falling off from the hook 24. Hence, when the armrest 4 is displaced from the storing range B toward the working range A, the armrest 4 can be smoothly displaced till the lower limit position L of the working range A.

The invention claimed is:

1. An armrest height-adjusting device of a vehicle seat having a seat bottom and a seat back rotatably attached to the seat bottom, comprising:
   a collar provided between an arm frame of the armrest and a seat back frame of the seat back and integrally rotating with the arm frame;
   a spring cover integrally rotating with the collar;
   a lock spring having a coil portion disposed around the collar, a first leg portion engaging with the seat back frame, and a second leg portion stored into a window portion of the spring cover; and
   a stationary plate fixed to the seat back frame and having a hook capable of engaging with the second leg portion;
   wherein the coil portion, in a state in which the second leg portion does not receive an external force, closely contacts the collar with adequate strength so as to generate an ordinary frictional resistance between the coil portion and the collar;
   wherein, when the armrest is rotated downward, a diameter of the coil portion becomes short by the ordinary frictional resistance so as to increase the frictional resistance between the coil portion and the collar;
   wherein, when the armrest is rotated upward, the diameter of the coil portion becomes large by the ordinary frictional resistance so as to reduce the frictional resistance between the coil portion and the collar;
   wherein, the window portion has an unlock abutting wall for abutting against the second leg portion so as to guide the second leg portion into the hook when the armrest is rotated upward beyond a predetermined position;
   wherein, the window portion further has a return inclined wall for abutting against the second leg portion so as to return the second leg portion to the inside of the window from the hook when the armrest is rotated downward in a state in which the second leg portion engages with the hook;
   wherein the frictional resistance between the coil portion and the collar, in a state in which the second leg portion engages with the hook, is kept in a weaker state than the ordinary frictional resistance.

2. The armrest height-adjusting device according to claim 1, wherein the hook has an inclined guide cam surface to guide the second leg portion into the hook when the second leg portion is displaced by abutment with the unlock abutting wall.

3. An armrest height-adjusting device of a vehicle seat having a seat bottom and a seat back rotatably attached to the seat bottom, comprising:
- a collar provided between an arm frame of the armrest and a seat back frame of the seat back and integrally rotating with the arm frame;
- a spring cover integrally rotating with the collar;
- a lock spring having a coil portion disposed around the collar, a first leg portion engaging with the seat back frame, and a second leg portion stored into a window portion of the spring cover; and
- a stationary plate fixed to the seat back frame and having a hook capable of engaging with the second leg portion;
- wherein the coil portion, in a state in which the second leg portion does not receive an external force, closely contacts the collar with adequate strength so as to generate an ordinary frictional resistance between the coil portion and the collar;
- wherein, when the armrest is rotated downward, a diameter of the coil portion becomes short by the ordinary frictional resistance so as to increase the frictional resistance between the coil portion and the collar;
- wherein, when the armrest is rotated upward, the diameter of the coil portion becomes large by the ordinary frictional resistance so as to reduce the frictional resistance between the coil portion and the collar;
- wherein, the window portion has an unlock abutting wall for abutting against the second leg portion so as to guide the second leg portion into the hook when the armrest is rotated upward beyond a predetermined position;
- wherein, the window portion further has a return inclined wall for abutting against the second leg portion so as to return the second leg portion to the inside of the window from the hook when the armrest is rotated downward in a state in which the second leg portion engages with the hook;
- wherein the frictional resistance between the coil portion and the collar, in a state in which the second leg portion engages with the hook, is kept in a weaker state than the ordinary frictional resistance;
- wherein the spring cover has a closed wall to prevent the second leg portion guided into the hook from falling off from the hook.

4. The armrest height-adjusting device according to claim 2, wherein the spring cover has a closed wall to prevent the second leg portion guided into the hook from falling off from the hook.

* * * * *